United States Patent
Kikuchi et al.

(10) Patent No.: US 10,950,848 B2
(45) Date of Patent: Mar. 16, 2021

(54) POSITIVE ELECTRODE AND ALKALINE SECONDARY BATTERY INCLUDING THE SAME

(71) Applicant: TOYOTA JIDOSHA KABUSHIKI KAISHA, Toyota (JP)

(72) Inventors: Takuro Kikuchi, Nagoya (JP); Motoyoshi Okumura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/152,528

(22) Filed: Oct. 5, 2018

(65) Prior Publication Data

US 2019/0115589 A1    Apr. 18, 2019

(30) Foreign Application Priority Data

Oct. 17, 2017    (JP) .............................. JP2017-200860

(51) Int. Cl.

| | |
|---|---|
| *H01M 4/32* | (2006.01) |
| *H01M 4/24* | (2006.01) |
| *H01M 4/52* | (2010.01) |
| *H01M 4/38* | (2006.01) |
| *H01M 4/36* | (2006.01) |
| *H01M 4/66* | (2006.01) |

(Continued)

(52) U.S. Cl.
CPC ............. *H01M 4/32* (2013.01); *H01M 4/242* (2013.01); *H01M 4/366* (2013.01); *H01M 4/38* (2013.01); *H01M 4/52* (2013.01); *H01M 4/521* (2013.01); *H01M 4/661* (2013.01); *H01M 10/30* (2013.01); *H01M 2004/021* (2013.01); *H01M 2300/0014* (2013.01)

(58) Field of Classification Search
CPC ............ H01M 3/32; H01M 4/24; H01M 4/36; H01M 4/52; H01M 4/38
See application file for complete search history.

(56) References Cited

U.S. PATENT DOCUMENTS

| | | | | |
|---|---|---|---|---|
| 4,037,032 A | * | 7/1977 | Nidola | H01M 2/02 429/199 |
| 5,965,295 A | * | 10/1999 | Bando | H01M 4/32 29/623.1 |
| 6,033,805 A | | 3/2000 | Dansui et al. | |

(Continued)

FOREIGN PATENT DOCUMENTS

| | | |
|---|---|---|
| JP | 11-135114 A | 5/1999 |
| JP | 2002-175833 A | 6/2002 |

(Continued)

*Primary Examiner* — Kenneth J Douyette
(74) *Attorney, Agent, or Firm* — Sughrue Mion, PLLC

(57) ABSTRACT

A positive electrode for an alkaline secondary battery includes a positive electrode substrate and a positive electrode composite material that is provided on at least one surface of the positive electrode substrate. The positive electrode substrate contains a Ni foil or a Ni-plated steel foil. The positive electrode composite material contains a positive electrode active material. The positive electrode active material contains nickel hydroxide coated with cobalt oxyhydroxide. A weight per unit area of the positive electrode composite material with respect to the one surface of the positive electrode substrate is 0.02 g/cm² to 0.035 g/cm².

4 Claims, 3 Drawing Sheets

(51) Int. Cl.
*H01M 10/30* (2006.01)
*H01M 4/02* (2006.01)

(56) References Cited

U.S. PATENT DOCUMENTS

| | | | | |
|---|---|---|---|---|
| 2004/0185341 | A1* | 9/2004 | Yamamoto | H01M 10/0587 |
| | | | | 429/209 |
| 2005/0271933 | A1* | 12/2005 | Matsumoto | H01M 2/22 |
| | | | | 429/127 |
| 2010/0193730 | A1* | 8/2010 | Yamamura | H01M 4/0402 |
| | | | | 252/182.1 |
| 2014/0295277 | A1 | 10/2014 | Yoshida et al. | |

FOREIGN PATENT DOCUMENTS

| | | |
|---|---|---|
| JP | 2003-297415 A | 10/2003 |
| JP | 2005-093294 A | 4/2005 |
| JP | 2006-244958 A | 9/2006 |
| JP | 2013-069671 A | 4/2013 |
| JP | 2013-138001 A | 7/2013 |
| KR | 10-1632128 B1 | 6/2016 |

* cited by examiner

POSITIVE ELECTRODE AND ALKALINE SECONDARY BATTERY INCLUDING THE SAME

INCORPORATION BY REFERENCE

The disclosure of Japanese Patent Application No. 2017-200860 filed on Oct. 17, 2017 including the specification, drawings and abstract is incorporated herein by reference in its entirety.

BACKGROUND

1. Technical Field

The present disclosure relates to a positive electrode and an alkaline secondary battery including the same.

2. Description of Related Art

As a substrate of a positive electrode for an alkaline secondary battery, a foamed nickel substrate (porous sheet) has been used in the related art in order to improve current collecting properties and the like. Here, Japanese Unexamined Patent Application Publication No. 2002-175833 (JP 2002-175833 A) discloses an alkaline secondary battery including a positive electrode in which, using a powder rolling method, an electrode composite material is supported on a porous metal sheet in which a plurality of openings having a burr part at a peripheral part are formed.

SUMMARY

A substrate having a porous structure (sponge structure) such as a foamed Ni porous sheet has excellent current collecting properties, but it has a problem of a high electrical resistance because it is porous. Since an alkaline secondary battery using a positive electrode substrate having a high electrical resistance has a high battery resistance (internal resistance), the loss is large and it is difficult to increase the output.

In order to reduce the loss and increase the output of an alkaline secondary battery, it is desired to further reduce the resistance (reduce the internal resistance) of the alkaline secondary battery. In particular, in alkaline secondary batteries used as drive power sources (automotive battery) of hybrid vehicles (HV), plug-in hybrid vehicles (PHV), electric vehicles (EV), and the like for which high output is necessary, there is a high demand for lower resistance.

Therefore, the present disclosure provides a positive electrode for an alkaline secondary battery through which it is possible to reduce an internal resistance of an alkaline secondary battery and an alkaline secondary battery using the same.

A first aspect of the present disclosure is a positive electrode for an alkaline secondary battery, including a positive electrode substrate containing a Ni foil or a Ni-plated steel foil and a positive electrode composite material that is provided on at least one surface of the positive electrode substrate. The positive electrode composite material contains a positive electrode active material. The positive electrode active material contains nickel hydroxide coated with cobalt oxyhydroxide. A weight per unit area of the positive electrode composite material with respect to the one surface of the positive electrode substrate is 0.02 g/cm$^2$ to 0.035 g/cm$^2$.

In the positive electrode for an alkaline secondary battery (hereinafter abbreviated as a "positive electrode" in some cases) of the present disclosure, it is thought that, when the Ni foil or Ni-plated steel foil is used as the positive electrode substrate, the electrical resistance of the positive electrode substrate is reduced compared to a case in which a porous substrate of the same volume is used. However, according to studies performed by the inventors, it was found that it is difficult to reduce the internal resistance of the battery including the positive electrode by simply using a Ni foil or a Ni-plated steel foil as the positive electrode substrate, and when a weight per unit area of the positive electrode composite material with respect to one side of the positive electrode substrate is limited to being within a range of 0.02 g/cm$^2$ to 0.035 g/cm$^2$, an effect of reducing the internal resistance of the battery is obtained compared to a case in which the positive electrode substrate is a porous substrate.

This is thought to be caused by the fact that, when a weight per unit area of the positive electrode composite material is larger, since the conductivity of the entire positive electrode deteriorates, a sufficient effect of reducing the internal resistance of the battery is not obtained. In addition, it is thought to be caused by the fact that, when a weight per unit area of the positive electrode composite material is smaller, since a proportion (thickness) of the separator increases, and the resistance of the entire electrode group (the positive electrode, the negative electrode and the separator) increases, a sufficient effect of reducing the internal resistance of the battery is not obtained.

Therefore, according to the present disclosure, when a Ni foil or a Ni-plated steel foil is used as the positive electrode substrate and a weight per unit area of the positive electrode composite material with respect to one side of the positive electrode substrate is set 0.02 g/cm$^2$ to 0.035 g/cm$^2$, it is possible to provide a positive electrode for an alkaline secondary battery through which it is possible to reduce the internal resistance of the alkaline secondary battery.

In the first aspect, a thickness of the positive electrode substrate may be 5 μm to 35 μm. When the thickness of the positive electrode substrate (the Ni foil or the Ni-plated steel foil) is in this range, an effect of reducing the internal resistance of the battery can be obtained more reliably. This is thought to be caused by the fact that, when the thickness of the positive electrode substrate is too thin, since the resistance of the positive electrode substrate increases, the conductivity of the entire electrode group (the positive electrode, the negative electrode, and the separator) decreases. In addition, this is thought to be caused by the fact that, when the thickness of the positive electrode substrate is too thick, since a proportion of the active material (positive electrode active material) becomes relatively smaller, the conductivity of the entire electrode group decreases.

A second aspect of the present disclosure is an alkaline secondary battery (hereinafter abbreviated as a "battery" in some cases) including this positive electrode. When the positive electrode is included, it is possible to reduce the internal resistance of the battery. In addition, according to reduction in the internal resistance of the battery, low loss and high output of the battery can be expected.

In the second aspect, a negative electrode containing a hydrogen storage alloy may be further included.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments (the present embodiment) of the present disclosure will be described below. However, the following description does not limit the scope of the claims.

In the present embodiment, an "alkaline secondary battery" generally refers to a secondary battery in which an electrolytic solution is an alkaline aqueous solution. Examples of the alkaline secondary battery include a nickel hydride battery, a nickel cadmium battery, a nickel zinc battery, and a nickel iron battery.

While a nickel hydride battery will be exemplified below as an alkaline secondary battery, the alkaline secondary battery of the present embodiment is not limited to a nickel hydride battery as long as it includes a positive electrode of the present disclosure.

<Alkaline Secondary Battery>

Figure 1:
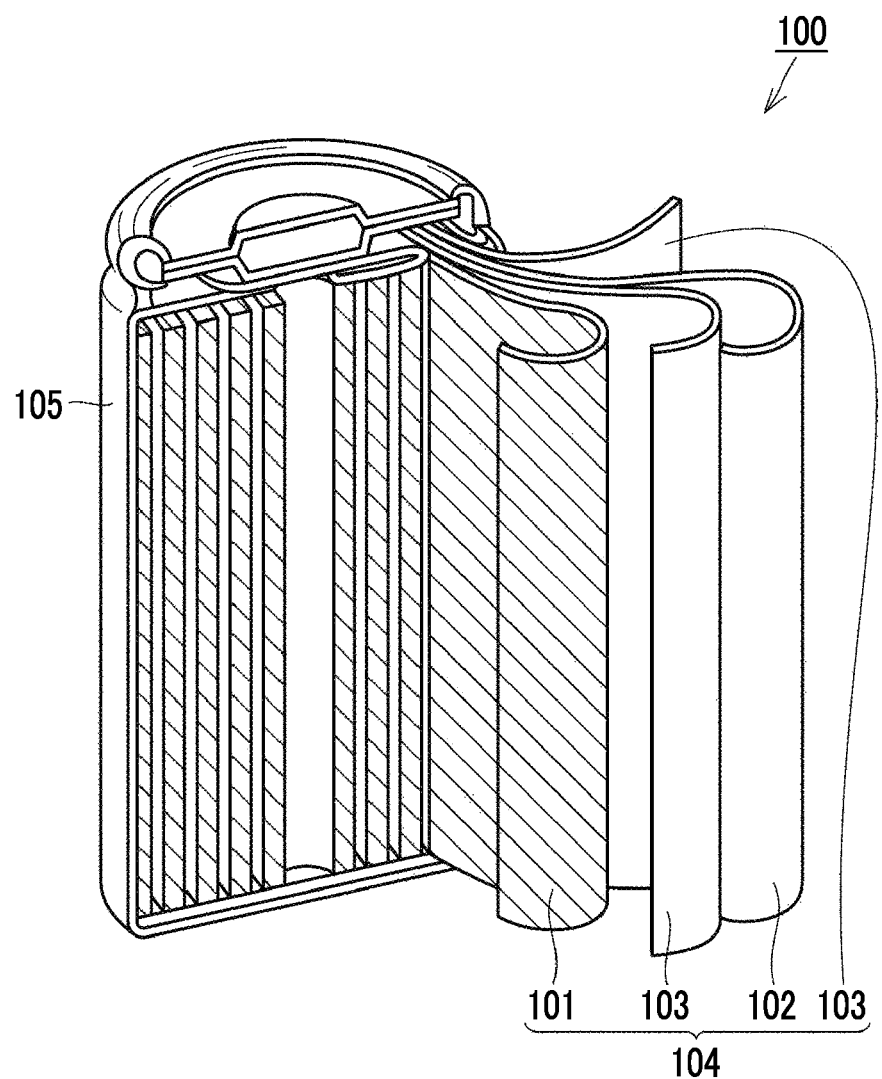
FIG. 1 is a schematic diagram of an example of a configuration of an alkaline secondary battery of the present embodiment.

FIG. 1 is a conceptual diagram of an example of a configuration of an alkaline secondary battery according to an embodiment of the present disclosure. A battery 100 includes a case 105. In the case 105, an electrode group 104 and an electrolytic solution (not shown) are accommodated.

The case 105 is sealed. The case 105 may be made of a metal, for example, an Al alloy, stainless steel (SUS), or iron (Fe), or made of a resin. The case 105 may include a current interruption mechanism (CID), a gas exhaust valve, an injection hole, and the like.

The electrode group 104 includes a positive electrode 101, a negative electrode 102 and separators 103. The positive electrode 101 faces the negative electrode 102 with the separator 103 interposed therebetween. The electrolytic solution is impregnated into the positive electrode 101, the negative electrode 102, and the separator 103.

For example, as shown in FIG. 1, the positive electrode 101, the separator 103, the negative electrode 102, and the separator 103 are laminated so that the separator 103 is interposed between the positive electrode 101 and the negative electrode 102, and additionally wound in a spiral shape, and thereby the electrode group 104 can be produced. Here, the present embodiment is not limited thereto. For example, the positive electrode 101 and the negative electrode 102 may be alternatively laminated with the separator 103 therebetween and thereby the electrode group 104 may be formed.

In addition, bipolar electrode plates may be laminated to form the electrode group 104 having a bipolar structure. The bipolar electrode plate includes a current collector plate (substrate), a positive electrode active material layer disposed on one side of the current collector plate and a negative electrode active material layer disposed on the other surface of the current collector plate. According to the electrode group having a bipolar structure, it is possible to form a compact battery having a high voltage. Here, since a positive electrode composite material and a negative electrode composite material are disposed on the front and back sides of a bipolar electrode substrate, a porous material such as a foamed nickel cannot be used and it is necessary to use a metal foil or the like as the substrate.

Positive Electrode

The positive electrode 101 includes a positive electrode substrate and a positive electrode composite material provided on at least one side of the positive electrode substrate. The positive electrode 101 may have, for example, a plate shape or a sheet shape. A planar shape thereof may be, for example, a band shape or a rectangular shape. The positive electrode 101 may have, for example, a thickness of about 10 μm to 1 mm.

The positive electrode substrate is a Ni foil or a Ni-plated steel foil. The surface of the positive electrode substrate need not necessarily be flat. The thickness of the positive electrode substrate is preferably 5 μm to 35 μm. It is considered that, when the thickness of the positive electrode substrate is in this range, an effect of reducing an internal resistance of the battery can be more reliably obtained.

The positive electrode composite material contains a positive electrode active material. The positive electrode active material contains nickel hydroxide coated with cobalt oxyhydroxide.

Here, nickel hydroxide functions as the positive electrode active material. That is, nickel hydroxide in a discharged state is nickel(II) hydroxide [$Ni(OH)_2$] and nickel hydroxide in a charged state is nickel oxyhydroxide [NiOOH]. Therefore, in the present disclosure, "containing nickel hydroxide" refers to containing at least one of nickel(II) hydroxide and nickel oxyhydroxide.

Therefore, as a raw material of the positive electrode active material, nickel(II) hydroxide in a discharged state may be prepared or nickel oxyhydroxide in a charged state may be prepared.

The positive electrode of the present embodiment may be a positive electrode before it is incorporated into a battery or a positive electrode after it is incorporated into a battery.

In the positive electrode before it is incorporated into a battery, as an example in which a positive electrode active material contains "nickel hydroxide coated with cobalt oxyhydroxide," a case in which nickel hydroxide powder coated with cobalt oxyhydroxide [CoOOH] in advance or the like is used as a raw material of the positive electrode active material to produce a positive electrode may be exemplified.

In addition, in the positive electrode after it is incorporated into a battery, as an example in which a positive electrode active material contains "nickel hydroxide coated with cobalt oxyhydroxide," similarly, a case in which nickel hydroxide powder coated with cobalt oxyhydroxide [CoOOH] in advance or the like is used as a raw material of the positive electrode active material to produce a positive electrode may be exemplified.

However, in the positive electrode after it is incorporated into a battery, as an example in which a positive electrode active material contains "nickel hydroxide coated with cobalt oxyhydroxide," in addition thereto, a case in which nickel hydroxide powder coated with cobalt hydroxide [$Co(OH)_2$] in advance or the like is used as a raw material of the positive electrode active material to produce a positive electrode may be exemplified. Here, nickel hydroxide coated with cobalt hydroxide is converted into cobalt oxyhydroxide when cobalt hydroxide is irreversibly oxidized due to initial charging or the like, and thus "nickel hydroxide coated with cobalt oxyhydroxide" is obtained.

In addition, in the positive electrode before it is incorporated into a battery, even if nickel hydroxide is not coated with cobalt hydroxide or cobalt oxyhydroxide, when the positive electrode composite material contains cobalt hydroxide (conductive material), in the positive electrode after it is incorporated into a battery, the positive electrode active material may contain "nickel hydroxide coated with cobalt oxyhydroxide." This is because cobalt hydroxide dissolves first in an electrolytic solution (alkaline aqueous solution) and is then precipitated on the surface of nickel hydroxide, and is oxidized during initial charging, and becomes cobalt oxyhydroxide.

Here, "nickel hydroxide coated with cobalt oxyhydroxide" means that at least a part of the surface of nickel hydroxide is coated, but it is not necessary to cover the entire surface of the nickel hydroxide.

The positive electrode active material may contain other elements, compounds, and the like as long as nickel hydroxide coated with cobalt oxyhydroxide is contained. Examples of other elements include magnesium (Mg), aluminum (Al), manganese (Mn), and zinc (Zn).

When the positive electrode active material is a powder, the powder may have, for example, an average particle size of 1 µm to 30 µm. The "average particle size" in this specification refers to a particle size at which a cumulative volume from the fine particle side is 50% of the total volume in a volume-based particle size distribution measured by a laser diffraction scattering method. The positive electrode active material may be synthesized or purchased.

The positive electrode composite material may contain other materials as long as a positive electrode active material is contained. Examples of other materials include a binder, and a conductive material.

The binder is not particularly limited. The binder may be, for example, carboxymethyl cellulose (CMC), polyvinyl alcohol (PVA), hydroxypropyl cellulose (HPC), polyacrylic acid (PAA), polytetrafluoroethylene (PTFE), a tetrafluoroethylene and perfluoroalkyl vinyl ether copolymer (PFA), a tetrafluoroethylene or hexafluoropropylene copolymer (FEP), styrene butadiene rubber (SBR), or acrylonitrile butadiene rubber (NBR). One type of binder may be used alone and two or more types of binders may be used in combination. A content of the binder may be, for example, 0.1 parts by mass to 10 parts by mass with respect to 100 parts by mass of the positive electrode active material.

The conductive material is not particularly limited. The conductive material may be, for example, carbon black, vapor grown carbon fibers (VGCF), graphite, cobalt oxide (CoO), or cobalt hydroxide [$Co(OH)_2$]. Here, as described above, when nickel hydroxide which is a positive electrode active material is not coated with cobalt hydroxide or cobalt oxyhydroxide, the conductive material may contain cobalt hydroxide. One type of conductive material may be used alone or two or more types of conductive materials may be used in combination. A content of the conductive material may be, for example, 0.1 parts by mass to 20 parts by mass with respect to 100 parts by mass of the positive electrode active material.

For example, a raw material powder of a positive electrode composite material containing a positive electrode active material, a binder and the like, and a solvent are mixed to prepare a positive electrode paste. The solvent may be appropriately selected according to a type of the binder and the like. The solvent typically is water. The positive electrode paste is applied to a surface of a positive electrode substrate and dried to produce a positive electrode. The positive electrode may be rolled so that it has a predetermined thickness. The positive electrode may be cut into a predetermined shape by a cutting device or the like. The positive electrode may be cut into a planar shape, for example, a band shape or a rectangular shape.

A weight per unit area (mass per unit area) of the positive electrode composite material with respect to one side of the positive electrode substrate is 0.02 $g/cm^2$ to 0.035 $g/cm^2$. Here, when the weight per unit area of the positive electrode composite material is set within this range, it is possible to reduce the internal resistance of the battery compared with when the positive electrode substrate is a porous substrate (foamed Ni or the like).

The thickness of the positive electrode composite material with respect to the weight per unit area of the positive electrode composite material is, for example, 70 µm to 120 µm per one side.

Here, while a method of producing a positive electrode using a positive electrode paste has been described in the present embodiment, the present disclosure is not limited thereto. The positive electrode of the present embodiment may be produced by, for example, loading a positive electrode composite material on a surface of a positive electrode substrate by a powder rolling method.

Negative Electrode

The negative electrode 102 may have, for example, a plate shape or a sheet shape. A planar shape thereof may be, for example, a band shape or a rectangular shape. The negative electrode 102 may have, for example, a thickness of about 10 µm to 1 mm.

The negative electrode 102 may contain a hydrogen storage alloy. The hydrogen storage alloy is an alloy that reversibly occludes and releases hydrogen. The hydrogen storage alloy functions as a negative electrode active material. The hydrogen storage alloy is not particularly limited.

Examples of the hydrogen storage alloy include AB type alloys (for example, TiFe), $AB_2$ type alloys (for example, $ZrMn_2$, $ZrV_2$, and $ZrNi_2$), $A_2B$ type alloys (for example, $Mg_2Ni$ and $Mg_2Cu$), $AB_5$ type alloys (for example, $CaNi_5$, $LaNi_5$, and $MmNi_5$). Here, "Mm" indicates a mixture of rare earth metals called misch metal. One type of hydrogen storage alloy may be used alone or two or more types of hydrogen storage alloys may be used in combination. A powder of the hydrogen storage alloy may have, for example, an average particle size of 1 µm to 30 µm.

The negative electrode 102 may be, for example, a molded article of the hydrogen storage alloy, or a hydrogen storage alloy that is held on a negative electrode substrate.

Examples of the negative electrode substrate include a porous metal (such as a foamed nickel substrate) and a perforated metal plate (punched metal). The perforated metal plate may be made of, for example, iron. The perforated metal plate may be subjected to, for example, nickel plating.

The negative electrode composite material may contain other materials as long as a hydrogen storage alloy (negative electrode active material) is contained. Examples of other materials include a conductive material and a binder.

The conductive material is not particularly limited. Examples of the conductive material include Cu powder, Ni powder, and materials exemplified as a conductive material of the positive electrode 101. One type of conductive material may be used alone or two or more types of conductive materials may be used in combination.

The binder is not particularly limited. The binder may be, for example, the same material as a binder of the positive electrode 101. One type of binder may be used alone or two or more types of binders may be used in combination.

For example, a raw material powder of a negative electrode composite material containing a negative electrode active material, a binder, and the like and a solvent are mixed to prepare a negative electrode paste. The negative electrode paste is applied to a surface of a negative electrode substrate and dried to produce a negative electrode. The negative electrode may be rolled so that it has a predetermined thickness. The negative electrode may be cut into a predetermined planar shape.

The thickness of the negative electrode composite material is, for example, 40 μm to 80 μm per one side.

Electrolytic Solution

The electrolytic solution is an alkaline aqueous solution. Examples of the electrolytic solution include an aqueous solution mainly containing a hydroxide (metal hydroxide) such as potassium hydroxide (KOH), sodium hydroxide (NaOH), or lithium hydroxide (LiOH). Here, the electrolytic solution may contain one type of hydroxide alone or two or more types of hydroxides. A concentration of the hydroxide in the electrolytic solution may be, for example, about 1 mol/L to 20 mol/L.

Separator

The separator 103 is an electrically insulating porous sheet. The separator is not particularly limited, and a member known as a separator of a nickel hydride battery or the like can be used. The separator 103 may be, for example, a nonwoven fabric. The nonwoven fabric may have, for example, a basis weight of 50 $g/m^2$ to 100 $g/m^2$. Examples of a material of the separator 103 include a polyolefin (polypropylene, polyethylene, or the like) and a polyamide. Hydrophilicity may be imparted to the separator 103. For example, hydrophilicity may be imparted to the separator 103 according to a sulfonation treatment, a plasma treatment, or the like.

Here, in the battery, there is an amount of the electrolytic solution necessary for an amount of the positive electrode active material. Accordingly, since an amount of liquid retention required for the separator is reduced with respect to the positive electrode having a small weight per unit area of the positive electrode composite material as described above, it is possible to reduce the thickness of the separator. When the thickness of the separator decreases, since the density of the active material (the positive electrode active material and the negative electrode active material) increases, it is possible to reduce the battery resistance (internal resistance). In this regard, the thickness of the separator can be, for example, 50 μm to 120 μm. Here, the porosity of the separator is, for example, 40 volume % to 70 volume %.

For example, a predetermined amount of the electrolytic solution required for the positive electrode active material is generally known. Thus, the battery is designed so that voids of an electrode group (a positive electrode composite material, a negative electrode composite material, and a separator) have about the same total volume as a predetermined amount of the electrolytic solution. For example, when a required amount of the electrolytic solution is A (mL), if a total volume of voids of the positive electrode composite material and the negative electrode composite material is B (mL), a total volume C of voids of the separator needs to be A-B (mL). The thickness of the separator is set according to the total volume C of voids of the separator, the porosity of the separator and the area of the separator. Here, volumes of voids of the positive electrode composite material, the negative electrode composite material and the separator can be obtained from respective volumes (including void parts) and the porosity. Respective volumes of the positive electrode composite material, the negative electrode composite material and the separator can be obtained from the area and the thickness.

Applications

The battery of the present embodiment can be used as a drive power source (automotive battery) of, for example, a hybrid vehicle (HV), a plug-in hybrid vehicle (PHV), and an electric vehicle (EV). However, applications of the battery of the present embodiment are not limited to a drive power source for automobiles. The battery of the present embodiment can be applied to any application.

Examples of the present disclosure will be described below. However, the following examples do not limit the scope of the claims.

Test Example 1

Production of Positive Electrode

A powder (average particle size: 10 μm) of nickel hydroxide (NiOH) coated with cobalt oxyhydroxide (CoOOH) was prepared as a positive electrode active material. A 0.7 mass % CMC aqueous solution was prepared. The positive electrode active material powder and the CMC aqueous solution were mixed. Thereby, a positive electrode paste was prepared.

Figure 2:
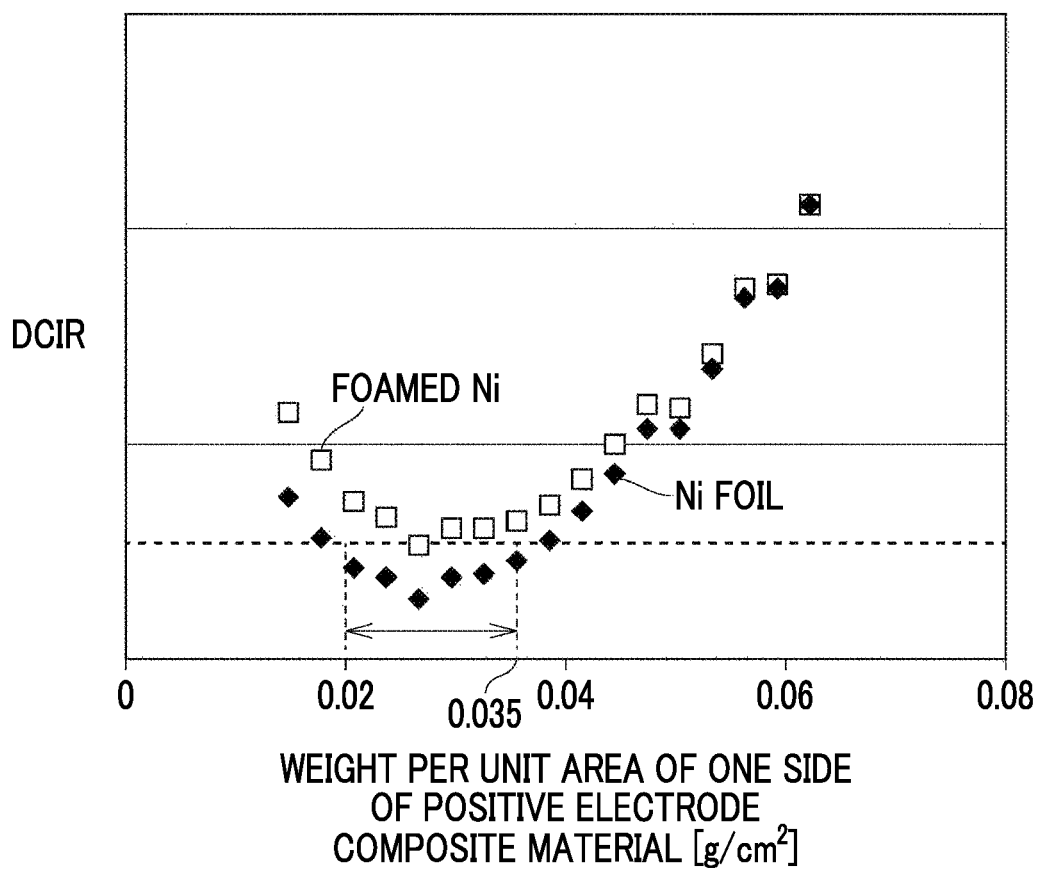
FIG. 2 is a graph showing the relationship between a weight per unit area of a positive electrode composite material in Test Example 1 and a DC internal resistance (DCIR) of a battery.

As a positive electrode substrate, a Ni foil with a thickness of 15 μm was prepared. The positive electrode paste was applied to both sides of the Ni foil and dried. An amount of the positive electrode paste applied was adjusted so that a weight per unit area of the positive electrode composite material after drying per one side of the positive electrode substrate (Ni foil) was as shown in FIG. 2. Thereby, a plurality of types of positive electrodes with different weights per unit area of the positive electrode composite material were produced. The positive electrode was rolled so that it had a density of about 3 $g/cm^3$ according to the weight per unit area. The positive electrode was cut into a band shape.

In addition, for comparison, a plurality of types of positive electrodes were produced in the same manner as above except that a positive electrode paste was impregnated into a foamed Ni substrate having the same weight per unit area as the above Ni foil and dried to produce a positive electrode.

Production of Negative Electrode

A hydrogen storage alloy ($AB_5$ type alloy) powder was prepared. An average particle size of the powder was 20 μm.

The hydrogen storage alloy powder, a CMC aqueous solution, and a PTFE aqueous dispersion solution were mixed. Thereby, a negative electrode paste was prepared. A punched metal (thickness: 60 μm) was prepared. The negative electrode paste was applied to both sides of the punched metal and dried. Thereby, a negative electrode was produced. The negative electrode was rolled and cut into a band shape. The cut negative electrode was designed so that it had a charging capacity of about 1.5 times a charging capacity of the positive electrode.

Assembly of Battery

A nonwoven fabric made of polyolefin resin fibers was prepared as the separator. The separator had a thickness of 150 μm. The positive electrode, the separator and the negative electrode were disposed so that the positive electrode faced the negative electrode with the separator therebetween, and thereby an electrode group sheet was formed. The electrode group sheet (the positive electrode, the separator and the negative electrode) was wound in a spiral shape. Thereby, an electrode group was formed. The electrode group was accommodated in a case (a cylindrical metal case with a lid). An electrolytic solution was injected into the case. The electrolytic solution was a KOH aqueous solution (7 mol/L). The case was sealed.

Accordingly, a plurality of types of alkaline secondary batteries of Test Example 1 were produced.

Measurement of DC Internal Resistance (DCIR)

Charged states of the batteries produced in Test Example 1 were adjusted so that a state of charge (SOC) became about 60% of the initial capacity. Then, the batteries were discharged under an atmosphere of 25° C. for 2 seconds at a current value of 3 C, and a voltage value 2 seconds after discharging was started was measured. A DC internal resistance (DCIR) was calculated from the relationship between the amount of voltage drop and the current during discharging. Here, "C" is a unit of current rate. "1 C" indicates a current rate at which a state of charge (SOC) reaches 100% from 0% according to charging for 1 hour. FIG. 2 shows trial calculation results of the DCIR when a total volume of the electrode group (the positive electrode, the negative electrode and the separator) was constant according to measurement results of the DCIR.

Based on the results shown in FIG. 2, it is thought that, when a weight per unit area of the positive electrode composite material with respect to one side of the positive electrode substrate was limited to being within a range of 0.02 g/cm$^2$ to 0.035 g/cm$^2$, it was possible to reduce the internal resistance of the battery including an electrode group having the same volume compared to a DCIR value (value indicated by a dotted line in FIG. 2) that became a minimum according to adjustment of a weight per unit area of the positive electrode composite material when the positive electrode substrate was a porous substrate (foamed Ni).

Test Example 2

Figure 3:
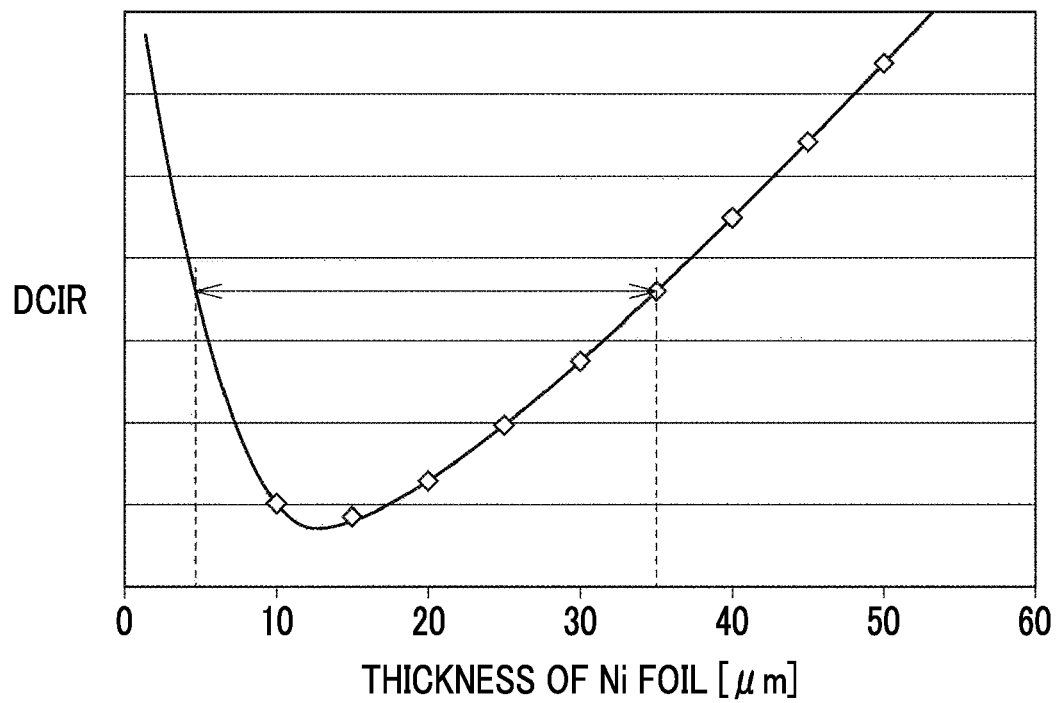
FIG. 3 is a graph showing the relationship between a thickness of a positive electrode substrate (Ni foil) in Test Example 2 and a DC internal resistance (DCIR) of a battery.

Batteries were produced in the same manner as in Test Example 1 except that a weight per unit area of the positive electrode composite material was 0.03 g/cm$^2$ and the thickness of the Ni foil was changed as shown in FIG. 3. The DCIR of these batteries was measured in the same manner as in Test Example 1. FIG. 3 shows trial calculation results of the DCIR when a total volume of the electrode group was constant according to measurement results of the DCIR.

Based on the results shown in FIG. 3, it can be understood that, when the thickness of the positive electrode substrate was 5 µm to 35 µm, an effect of reducing the internal resistance of the battery can be obtained more reliably.

The above embodiments and examples are only examples and should not be considered as restrictive. The technical scope determined by the scope of the claims includes meanings equivalent to the scope of the claims and all modifications within the scope of the claims.

What is claimed is:

1. A positive electrode for an alkaline secondary battery comprising:
    a positive electrode substrate containing a Ni foil or a Ni-plated steel foil; and
    a positive electrode composite material that is provided on at least one surface of the positive electrode substrate,
    wherein the Ni foil and the Ni-plated steel foil are not porous,
    the positive electrode composite material contains a positive electrode active material,
    the positive electrode active material contains nickel hydroxide coated with cobalt oxyhydroxide, and
    a weight per unit area of the positive electrode composite material with respect to the one surface of the positive electrode substrate is 0.02 g/cm$^2$ to 0.035 g/cm$^2$.

2. The positive electrode according to claim 1, wherein a thickness of the positive electrode substrate is 5 µm to 35 µm.

3. An alkaline secondary battery comprising:
    the positive electrode according to claim 1.

4. The alkaline secondary battery according to claim 3, further comprising
    a negative electrode containing a hydrogen storage alloy.

* * * * *